US012665418B2

(12) United States Patent　　　(10) Patent No.: US 12,665,418 B2
Mitani　　　　　　　　　　　　　　(45) Date of Patent: Jun. 23, 2026

(54) POWER SUPPLY SYSTEM AND MOVING OBJECT

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/024,570

(22) Filed: Jan. 16, 2025

(65) Prior Publication Data

US 2025/0273955 A1　　　Aug. 28, 2025

(30) Foreign Application Priority Data

Feb. 28, 2024　(JP) ................................. 2024-028546

(51) Int. Cl.
　　*H02J 9/06*　　　(2006.01)
　　*H02J 1/00*　　　(2026.01)
　　*H02J 1/08*　　　(2006.01)
　　*H02J 1/10*　　　(2026.01)
　　*H02J 3/38*　　　(2026.01)
　　　　　　(Continued)

(52) U.S. Cl.
　　CPC .............. *H02J 1/084* (2020.01); *H02J 1/106* (2020.01); *B64C 27/325* (2013.01); *B64C 29/0091* (2013.01); *B64D 2221/00* (2013.01)

(58) Field of Classification Search
　　CPC .... H02J 1/084; H02J 1/106; H02J 1/10; H02J 7/34; B64C 27/325; B64C 29/0091; B64D 2221/00
　　USPC ........... 307/64, 66, 80, 10.1, 43, 9.1, 18, 75; 363/21.01, 71, 272, 50, 65, 9; 435/6.1; 436/501
　　See application file for complete search history.

(56) References Cited

U.S. PATENT DOCUMENTS

| 4,551,632 A | 11/1985 | Jourdan et al. |
| 2011/0285202 A1* | 11/2011 | Rozman ................... H02J 1/10 |
| | | 307/23 |

(Continued)

FOREIGN PATENT DOCUMENTS

| EP | 3 664 251 A1 | 6/2020 |
| JP | H06-003975 B2 | 1/1994 |
| JP | 2022-529997 A | 6/2022 |

OTHER PUBLICATIONS

Extended European Search Report dated Jul. 22, 2025 issued in corresponding European application No. 25156998.4; English text (10 pages).

*Primary Examiner* — Elim Ortiz
(74) *Attorney, Agent, or Firm* — Rankin, Hill & Clark LLP

(57)　　　　　ABSTRACT

A power supply system includes: a first power supply circuit for supplying, to a first load device, DC power output from a first power generation device; a second power supply circuit for supplying, to a second load device, DC power output from a second power generation device; and a first connection circuit including a first connection device capable of connecting the positive side of the first power supply circuit and the positive side of the second power supply circuit, and a second connection device capable of connecting the negative side of the first power supply circuit and the negative side of the second power supply circuit. The first connection device and the second connection device are disposed on one end side and the other end side of the first connection circuit, respectively.

9 Claims, 10 Drawing Sheets

(51) Int. Cl.

| | |
|---|---|
| *H02J 7/00* | (2026.01) |
| *H02J 7/02* | (2016.01) |
| *H02J 7/34* | (2006.01) |
| *H02M 3/28* | (2006.01) |
| *H02M 3/335* | (2006.01) |
| *H02M 7/48* | (2007.01) |
| *B64C 27/32* | (2006.01) |
| *B64C 29/00* | (2006.01) |

(56) References Cited

U.S. PATENT DOCUMENTS

| | | | |
|---|---|---|---|
| 2022/0204173 A1 | 6/2022 | Barraco et al. | |
| 2022/0271560 A1* | 8/2022 | Mitani ............... | H02J 1/086 |
| 2023/0318303 A1* | 10/2023 | Mitani ............... | H02J 3/38 |
| | | | 307/18 |

* cited by examiner

POWER SUPPLY SYSTEM AND MOVING OBJECT

CROSS-REFERENCE TO RELATED APPLICATIONS

This application is based upon and claims the benefit of priority from Japanese Patent Application No. 2024-028546 filed on Feb. 28, 2024, the contents of which are incorporated herein by reference.

BACKGROUND OF THE INVENTION

Field of the Invention

The present disclosure relates to a power supply system, and a moving object including the power supply system.

Description of the Related Art

In recent years, research and development has been conducted on electrification technology that contributes to energy efficiency in order to ensure that more people have access to affordable, reliable, sustainable and modern energy.

JP H06-003975 B2 discloses a power supply system for an aircraft, which can supply electric power to a load even in an emergency by combining a plurality of generators and storage batteries.

SUMMARY OF THE INVENTION

There has been a demand for a power supply system with more redundancy, and a moving object including such a power supply system.

An object of the present invention is to solve the above-mentioned problem.

A first aspect of the present disclosure is a power supply system comprising: a first power supply circuit configured to supply, to a first load device, direct current electric power output from a first power generation device; a second power supply circuit configured to supply, to a second load device, direct current electric power output from a second power generation device; and a first connection circuit including a first connection device configured to connect a positive side of the first power supply circuit and a positive side of the second power supply circuit, and a second connection device configured to connect a negative side of the first power supply circuit and a negative side of the second power supply circuit, wherein the first connection device is disposed on one end side of the first connection circuit, and the second connection device is disposed on another end side of the first connection circuit.

A second aspect of the present disclosure is a moving object comprising the power supply system according to the first aspect.

According to the present invention, it is possible to provide a power supply system with more redundancy, and a moving object including such a power supply system.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Power Supply System]

Figure 1:
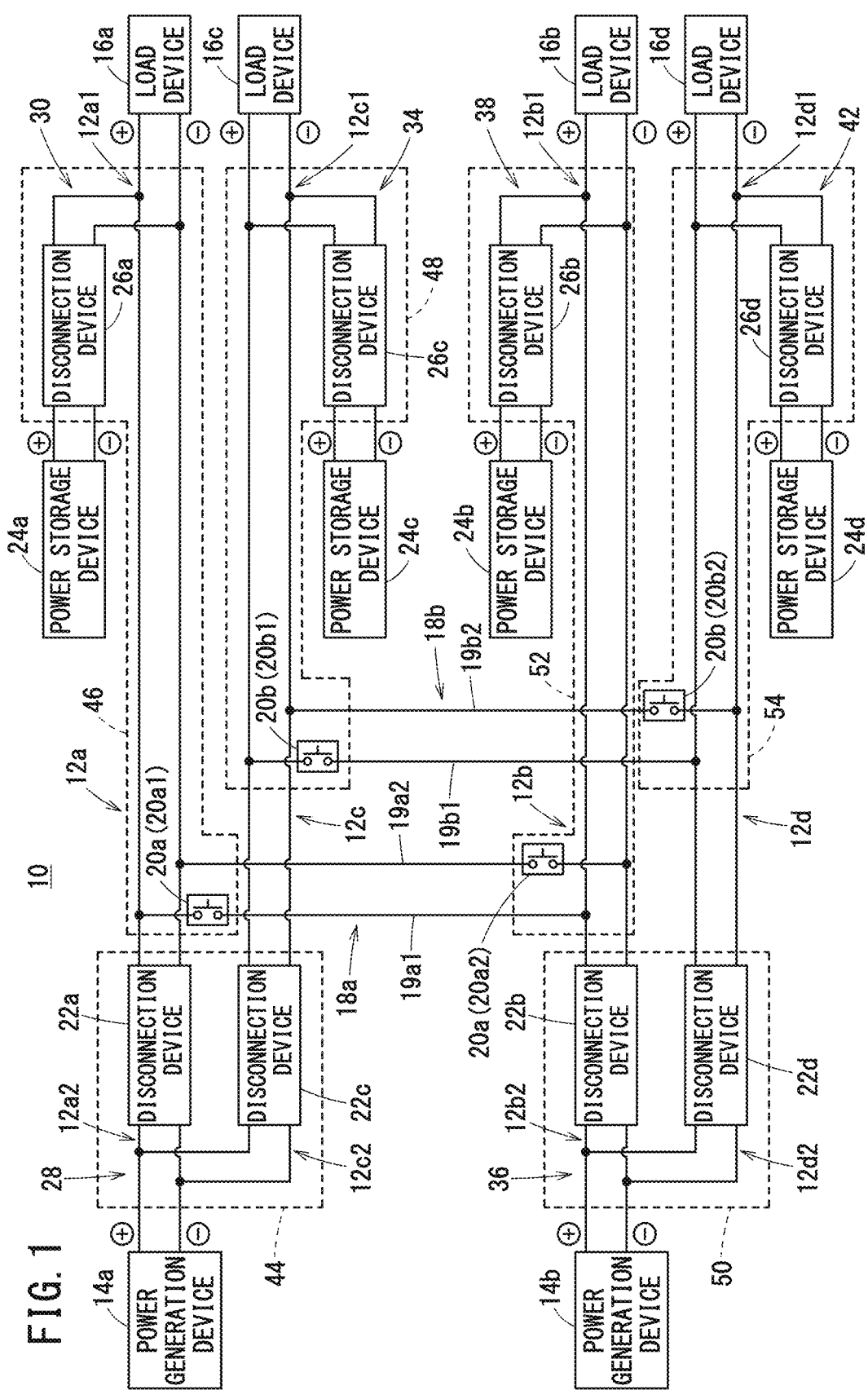
FIG. 1 is a first schematic view of a power supply system.

A power supply system 10 according to a first embodiment will be described with reference to the drawings. FIG. 1 is a first schematic view of the power supply system 10.

The power supply system 10 includes a first power supply circuit 12a, a second power supply circuit 12b, a third power supply circuit 12c, and a fourth power supply circuit 12d. The first power supply circuit 12a supplies, to a first load device 16a, DC power output from a first power generation device 14a. The second power supply circuit 12b supplies, to a second load device 16b, DC power output from a second power generation device 14b. The third power supply circuit 12c supplies, to a third load device 16c, the DC power output from the first power generation device 14a. The fourth power supply circuit 12d supplies, to a fourth load device 16d, the DC power output from the second power generation device 14b.

The first power supply circuit 12a includes a partial circuit 12a2 (a second partial circuit) and a partial circuit 12a1 (a first partial circuit) between the first power generation device 14a and the first load device 16a. For example, the partial circuit 12a2 and the partial circuit 12a1 are each provided in a distribution board or a junction box. The partial circuit 12a2 and the partial circuit 12a1 are connected to each other. The partial circuit 12a2 is connected to the first power generation device 14a. On the other hand, the partial circuit 12a1 is connected to the first load device 16a. The partial circuit 12a2 and the partial circuit 12a1 relay DC power between the first power generation device 14a and the first load device 16a. Hereinafter, a device including the partial circuit 12a2 and a disconnection device 22a (a second disconnection device) to be described later is referred to as a relay device 28 (a second relay device). Similarly, a device including the partial circuit 12a1 and a disconnection device 26a (a first disconnection device) to be described later is referred to as a relay device 30 (a first relay device).

The second power supply circuit 12b includes a partial circuit 12b2 (a fourth partial circuit) and a partial circuit 12b1 (a third partial circuit) between the second power generation device 14b and the second load device 16b. For example, the partial circuit 12b2 and the partial circuit 12b1 are each provided in a distribution board or a junction box.

The partial circuit 12*b*2 and the partial circuit 12*b*1 are connected to each other. The partial circuit 12*b*2 is connected to the second power generation device 14*b*. On the other hand, the partial circuit 12*b*1 is connected to the second load device 16*b*. The partial circuit 12*b*2 and the partial circuit 12*b*1 relay DC power between the second power generation device 14*b* and the second load device 16*b*. Hereinafter, a device including the partial circuit 12*b*2 and a disconnection device 22*b* (a fourth disconnection device) to be described later is referred to as a relay device 36 (a fourth relay device). Similarly, a device including the partial circuit 12*b*1 and a disconnection device 26*b* (a third disconnection device) to be described later is referred to as a relay device 38 (a third relay device).

The third power supply circuit 12*c* includes a partial circuit 12*c*2 and a partial circuit 12*c*1 between the first power generation device 14*a* and the third load device 16*c*. For example, the partial circuit 12*c*2 and the partial circuit 12*c*1 are each provided in a distribution board or a junction box. The partial circuit 12*c*2 and the partial circuit 12*c*1 are connected to each other. The partial circuit 12*c*2 is connected to the first power generation device 14*a*. On the other hand, the partial circuit 12*c*1 is connected to the third load device 16*c*. The partial circuit 12*c*2 and the partial circuit 12*c*1 relay DC power between the first power generation device 14*a* and the third load device 16*c*. Hereinafter, a device including the partial circuit 12*c*1 and a disconnection device 26*c* to be described later is referred to as a relay device 34. On the other hand, the partial circuit 12*c*2 and a disconnection device 22*c* to be described later are included in the relay device 28.

The fourth power supply circuit 12*d* includes a partial circuit 12*d*2 and a partial circuit 12*d*1 between the second power generation device 14*b* and the fourth load device 16*d*. For example, the partial circuit 12*d*2 and the partial circuit 12*d*1 are each provided in a distribution board or a junction box. The partial circuit 12*d*2 and the partial circuit 12*d*1 are connected to each other. The partial circuit 12*d*2 is connected to the second power generation device 14*b*. On the other hand, the partial circuit 12*d*1 is connected to the fourth load device 16*d*. The partial circuit 12*d*2 and the partial circuit 12*d*1 relay DC power between the second power generation device 14*b* and the fourth load device 16*d*. Hereinafter, a device including the partial circuit 12*d*1 and a disconnection device 26*d* to be described later is referred to as a relay device 42. On the other hand, the partial circuit 12*d*2 and a disconnection device 22*d* to be described later are included in the relay device 36.

The first power generation device 14*a* and the second power generation device 14*b* each include an engine, a generator, and a power control unit (all of them not shown). The engine drives the generator, and the generator generates three-phase AC power. The power control unit converts the three-phase AC power into DC power.

The first power generation device 14*a* and the second power generation device 14*b* may each include various sensors such as a voltage sensor and a current sensor. Further, the first power generation device 14*a* and the second power generation device 14*b* may each include elements such as a fuse, a relay, a breaker, a diode, a transistor, a resistor, a coil, and a capacitor.

The first load device 16*a*, the second load device 16*b*, third load device 16*c*, and the fourth load device 16*d* each include an inverter and an electric motor (both of them not shown). The inverter converts the input DC power into three-phase AC power, and the electric motor is driven by the three-phase AC power. The first load device 16*a*, the second load device 16*b*, the third load device 16*c*, and the fourth load device 16*d* may each include a DC/DC converter and a low-voltage drive device (both of them not shown). The DC/DC converter lowers the voltage of the input DC power, and the low-voltage drive device is driven by the DC power.

The first load device 16*a*, the second load device 16*b*, the third load device 16*c*, and the fourth load device 16*d* may each include various sensors such as a voltage sensor and a current sensor. Further, the first load device 16*a*, the second load device 16*b*, the third load device 16*c*, and the fourth load device 16*d* may each include elements such as a fuse, a relay, a breaker, a diode, a transistor, a resistor, a coil, and a capacitor.

The power supply system 10 includes a first connection circuit 18*a*. A first end portion (one end) of the first connection circuit 18*a* is connected to the partial circuit 12*a*1 of the first power supply circuit 12*a*. A second end portion (another end) of the first connection circuit 18*a* is connected to the partial circuit 12*b*1 of the second power supply circuit 12*b*. The first connection circuit 18*a* includes a positive wire 19*a*1 and a negative wire 19*a*2. The positive wire 19*a*1 is connected to the positive side of the partial circuit 12*a*1 and the positive side of the partial circuit 12*b*1. The negative wire 19*a*2 is connected to the negative side of the partial circuit 12*a*1 and the negative side of the partial circuit 12*b*1. A first connection device 20*a*1 is disposed on the positive wire 19*a*1. A second connection device 20*a*2 is disposed on the negative wire 19*a*2. The first connection device 20*a*1 can connect the positive side of the partial circuit 12*a*1 and the positive side of the partial circuit 12*b*1. The second connection device 20*a*2 can connect the negative side of the partial circuit 12*a*1 and the negative side of the partial circuit 12*b*1.

The first connection device 20*a*1 is disposed on the first end portion side of the first connection circuit 18*a*. Specifically, the first connection device 20*a*1 is close to the partial circuit 12*a*1 of the first power supply circuit 12*a* and is separated from the partial circuit 12*b*1 of the second power supply circuit 12*b*. In other words, the distance between the first connection device 20*a*1 and the partial circuit 12*a*1 is shorter than the distance between the first connection device 20*a*1 and the partial circuit 12*b*1.

The second connection device 20*a*2 is disposed on the second end portion side of the first connection circuit 18*a*. Specifically, the second connection device 20*a*2 is close to the partial circuit 12*b*1 of the second power supply circuit 12*b* and is separated from the partial circuit 12*a*1 of the first power supply circuit 12*a*. In other words, the distance between the second connection device 20*a*2 and the partial circuit 12*b*1 is shorter than the distance between the second connection device 20*a*2 and the partial circuit 12*a*1.

The power supply system 10 includes a second connection circuit 18*b*. A first end portion (one end) of the second connection circuit 18*b* is connected to the partial circuit 12*c*1 of the third power supply circuit 12*c*. A second end portion (another end) of the second connection circuit 18*b* is connected to the partial circuit 12*d*1 of the fourth power supply circuit 12*d*. The second connection circuit 18*b* includes a positive wire 19*b*1 and a negative wire 19*b*2. The positive wire 19*b*1 is connected to the positive side of the partial circuit 12*c*1 and the positive side of the partial circuit 12*d*1. The negative wire 19*b*2 is connected to the negative side of the partial circuit 12*c*1 and the negative side of the partial circuit 12*d*1. A third connection device 20*b*1 is disposed on the positive wire 19*b*1. A fourth connection device 20*b*2 is disposed on the negative wire 19*b*2. The third connection device 20*b*1 can connect the positive side of the partial circuit 12c1 and the positive side of the partial circuit 12d1. The fourth connection device 20b2 can connect the negative side of the partial circuit 12c1 and the negative side of the partial circuit 12d1.

The third connection device 20b1 is disposed on the first end portion side of the second connection circuit 18b. Specifically, the third connection device 20b1 is close to the partial circuit 12c1 of the third power supply circuit 12c and is separated from the partial circuit 12d1 of the fourth power supply circuit 12d. In other words, the distance between the third connection device 20b1 and the partial circuit 12c1 is shorter than the distance between the third connection device 20b1 and the partial circuit 12d1.

The fourth connection device 20b2 is disposed on the second end portion side of the second connection circuit 18b. Specifically, the fourth connection device 20b2 is close to the partial circuit 12d1 of the fourth power supply circuit 12d and is separated from the partial circuit 12c1 of the third power supply circuit 12c. In other words, the distance between the fourth connection device 20b2 and the partial circuit 12d1 is shorter than the distance between the fourth connection device 20b2 and the partial circuit 12c1.

The first connection device 20a1, the second connection device 20a2, the third connection device 20b1, and the fourth connection device 20b2 each include a switch. The switch may be formed of a relay or a contactor. The first connection device 20a1, the second connection device 20a2, the third connection device 20b1, and the fourth connection device 20b2 may each further include a breaker.

Normally, the connection between the first power supply circuit 12a and the second power supply circuit 12b is cut off. Thus, when an electrical abnormality occurs in one of the first power supply circuit 12a or the second power supply circuit 12b, the other of the first power supply circuit 12a and the second power supply circuit 12b can be prevented from being affected by the abnormality. For example, when an overcurrent occurs in one of the first power supply circuit 12a or the second power supply circuit 12b, the overcurrent is prevented from flowing to the other of the first power supply circuit 12a and the second power supply circuit 12b.

Similarly, the connection between the third power supply circuit 12c and the fourth power supply circuit 12d is normally cut off. Thus, when an electrical abnormality occurs in one of the third power supply circuit 12c or the fourth power supply circuit 12d, the other of the third power supply circuit 12c and the fourth power supply circuit 12d can be prevented from being affected by the abnormality. For example, when an overcurrent occurs in one of the third power supply circuit 12c or the fourth power supply circuit 12d, the overcurrent is prevented from flowing to the other of the third power supply circuit 12c and the fourth power supply circuit 12d.

When the supply of electric power from the first power generation device 14a to the first power supply circuit 12a and the third power supply circuit 12c is cut off, the first power supply circuit 12a and the second power supply circuit 12b are connected by the first connection device 20a1 and the second connection device 20a2. Further, the third power supply circuit 12c and the fourth power supply circuit 12d are connected by the third connection device 20b1 and the fourth connection device 20b2. As a result, electric power is supplied from the second power generation device 14b to the first power supply circuit 12a and the third power supply circuit 12c.

When the supply of electric power from the second power generation device 14b to the second power supply circuit 12b and the fourth power supply circuit 12d is cut off, the first power supply circuit 12a and the second power supply circuit 12b are connected by the first connection device 20a1 and the second connection device 20a2. Further, the third power supply circuit 12c and the fourth power supply circuit 12d are connected by the third connection device 20b1 and the fourth connection device 20b2. As a result, electric power is supplied from the first power generation device 14a to the second power supply circuit 12b and the fourth power supply circuit 12d.

The power supply system 10 includes the disconnection devices 22a to 22d. The disconnection device 22a is disposed in the partial circuit 12a2 of the relay device 28. The disconnection device 22a can disconnect the first power generation device 14a from the partial circuit 12a1 and the first connection circuit 18a. The disconnection device 22b is disposed in the partial circuit 12b2 of the relay device 36. The disconnection device 22b can disconnect the second power generation device 14b from the partial circuit 12b1 and the first connection circuit 18a. The disconnection device 22c is disposed in the partial circuit 12c2 of the relay device 28. The disconnection device 22c can disconnect the first power generation device 14a from the partial circuit 12c1 and the second connection circuit 18b. The disconnection device 22d is disposed in the partial circuit 12d2 of the relay device 36. The disconnection device 22d can disconnect the second power generation device 14b from the partial circuit 12d1 and the second connection circuit 18b.

Each of the disconnection devices 22a to 22d includes a positive switch and a negative switch. The switch may be formed of a relay or a contactor. The disconnection devices 22a to 22d may each include a breaker.

The power supply system 10 includes a first power storage device 24a, a second power storage device 24b, a third power storage device 24c, and a fourth power storage device 24d. The first power storage device 24a is connected to the first power supply circuit 12a in parallel with the first power generation device 14a. The second power storage device 24b is connected to the second power supply circuit 12b in parallel with the second power generation device 14b. The third power storage device 24c is connected to the third power supply circuit 12c in parallel with the first power generation device 14a. The fourth power storage device 24d is connected to the fourth power supply circuit 12d in parallel with the second power generation device 14b.

The first power storage device 24a, the second power storage device 24b, the third power storage device 24c, and the fourth power storage device 24d each include a lithium ion battery. The first power storage device 24a, the second power storage device 24b, the third power storage device 24c, and the fourth power storage device 24d may each include a secondary battery other than the lithium ion battery. The first power storage device 24a, the second power storage device 24b, the third power storage device 24c, and the fourth power storage device 24d may each include a large-capacity capacitor.

The first power storage device 24a, the second power storage device 24b, the third power storage device 24c, and the fourth power storage device 24d may each include various sensors such as a voltage sensor and a current sensor. The first power storage device 24a, the second power storage device 24b, the third power storage device 24c, and the fourth power storage device 24d may each include elements such as a fuse, a relay, a breaker, a diode, a transistor, a resistor, a coil, and a capacitor.

The power supply system 10 includes the disconnection devices 26a to 26d. The disconnection device 26a is included in the relay device 30. The disconnection device 26a is disposed on a wire connecting the first power storage device 24a and the partial circuit 12a1. The disconnection device 26a can disconnect the first power storage device 24a from the partial circuit 12a1. The disconnection device 26b is included in the relay device 38. The disconnection device 26b is disposed on a wire connecting the second power storage device 24b and the partial circuit 12b1. The disconnection device 26b can disconnect the second power storage device 24b from the partial circuit 12b1. The disconnection device 26c is included in the relay device 34. The disconnection device 26c is disposed on a wire connecting the third power storage device 24c and the partial circuit 12c1. The disconnection device 26c can disconnect the third power storage device 24c from the partial circuit 12c1. The disconnection device 26d is included in the relay device 42. The disconnection device 26d is disposed on a wire connecting the fourth power storage device 24d and the partial circuit 12d1. The disconnection device 26d can disconnect the fourth power storage device 24d from the partial circuit 12d1.

Each of the disconnection devices 26a to 26d includes a positive switch and a negative switch. The switch may be formed of a relay or a contactor. The disconnection devices 26a to 26d may each include a breaker.

The power supply system 10 may include various sensors such as a voltage sensor and a current sensor, in addition to the above-described configuration. The power supply system 10 may include elements such as a fuse, a resistor, a coil, and a capacitor.

[Arrangement of Components of Power Supply System]

Figure 2:
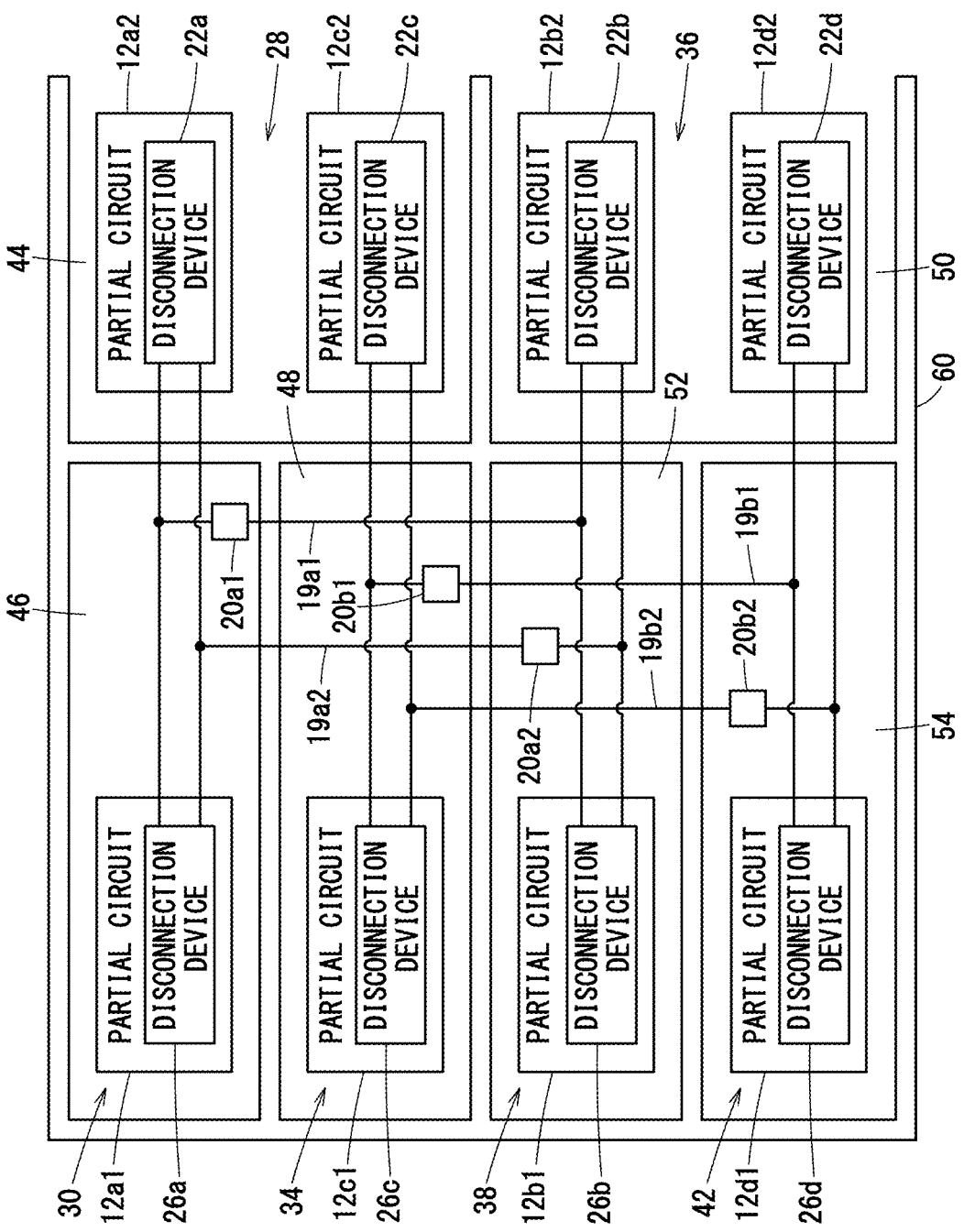
FIG. 2 is a second schematic view of the power supply system.

FIG. 2 is a second schematic view of the power supply system 10. The plurality of components constituting the power supply system 10 are arranged in a distributed manner in a plurality of areas 44, 46, 48, 50, 52, and 54. Specifically, the relay device 28, the relay device 30, the relay device 34, the relay device 36, the relay device 38, and the relay device 42 are disposed in areas different from each other.

The relay device 28 is disposed in the area 44. The relay device 30 is disposed in the area 46 (a first area). The relay device 34 is disposed in the area 48. The relay device 36 is disposed in the area 50. The relay device 38 is disposed in the area 52 (a second area). The relay device 42 is disposed in the area 54.

The first connection device 20a1 is disposed in the area 46 together with the relay device 30. The second connection device 20a2 is disposed in the area 52 together with the relay device 38. The third connection device 20b1 is disposed in the area 48 together with the relay device 34. The fourth connection device 20b2 is disposed in the area 54 together with the relay device 42.

The areas 44, 46, 48, 50, 52, and 54 are partitioned from each other by partitions 60. For example, two areas adjacent to each other, such as the area 44 and the area 46 shown in FIG. 2, may be partitioned by a common partition 60. Further, the areas 44, 46, 48, 50, 52, and 54 may be partitioned by partitions 60 different from each other. The partition 60 is preferably made of a flame-retardant material, but the material is not limited thereto.

[Operation of Power Supply System in Normal State]

Figure 3:
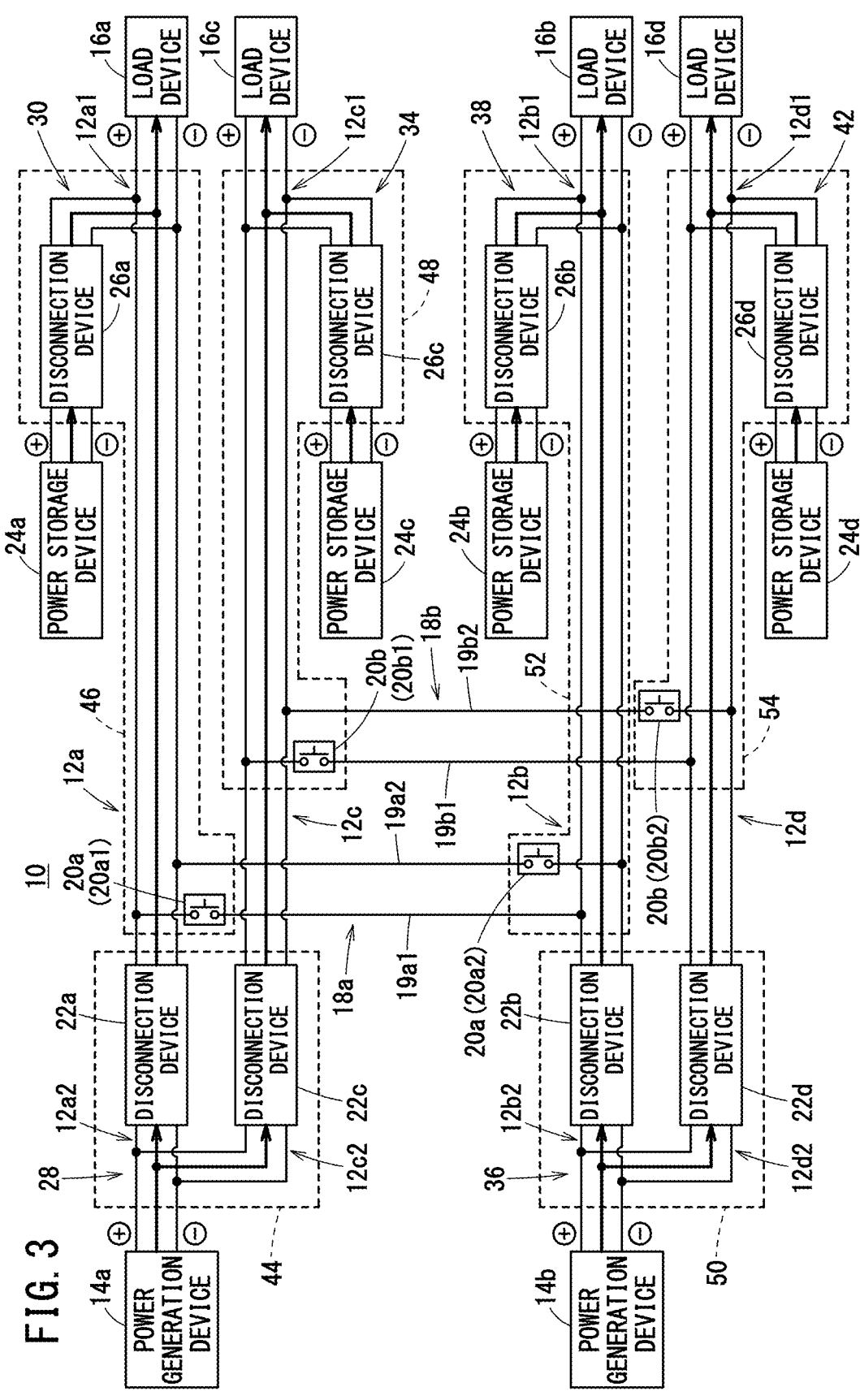
FIG. 3 is a diagram showing the operation of the power supply system in a normal state.

FIG. 3 is a diagram showing the operation of the power supply system 10 in a normal state. Arrows shown in FIG. 3 indicate electric power supply paths.

The first power generation device 14a is connected to the partial circuit 12a1 and the first connection circuit 18a by the disconnection device 22a. The first power generation device 14a is connected to the partial circuit 12c1 and the second connection circuit 18b by the disconnection device 22c. As a result, electric power is supplied from the first power generation device 14a to the first load device 16a and the third load device 16c. The second power generation device 14b is connected to the partial circuit 12b1 and the first connection circuit 18a by the disconnection device 22b, and the second power generation device 14b is connected to the partial circuit 12d1 and the second connection circuit 18b by the disconnection device 22d. As a result, electric power is supplied from the second power generation device 14b to the second load device 16b and the fourth load device 16d.

The first power storage device 24a is connected to the first load device 16a by the disconnection device 26a, and electric power is supplied from the first power storage device 24a to the first load device 16a. The second power storage device 24b is connected to the second load device 16b by the disconnection device 26b, and electric power is supplied from the second power storage device 24b to the second load device 16b. The third power storage device 24c is connected to the third load device 16c by the disconnection device 26c, and electric power is supplied from the third power storage device 24c to the third load device 16c. The fourth power storage device 24d is connected to the fourth load device 16d by the disconnection device 26d, and electric power is supplied from the fourth power storage device 24d to the fourth load device 16d.

The connection between the partial circuit 12a1 of the first power supply circuit 12a and the partial circuit 12b1 of the second power supply circuit 12b is interrupted by the first connection device 20a1 and the second connection device 20a2. The connection between the partial circuit 12c1 of the third power supply circuit 12c and the partial circuit 12d1 of the fourth power supply circuit 12d is interrupted by the third connection device 20b1 and the fourth connection device 20b2.

[Operation of Power Supply System when First Abnormality Occurs]

Figure 4:
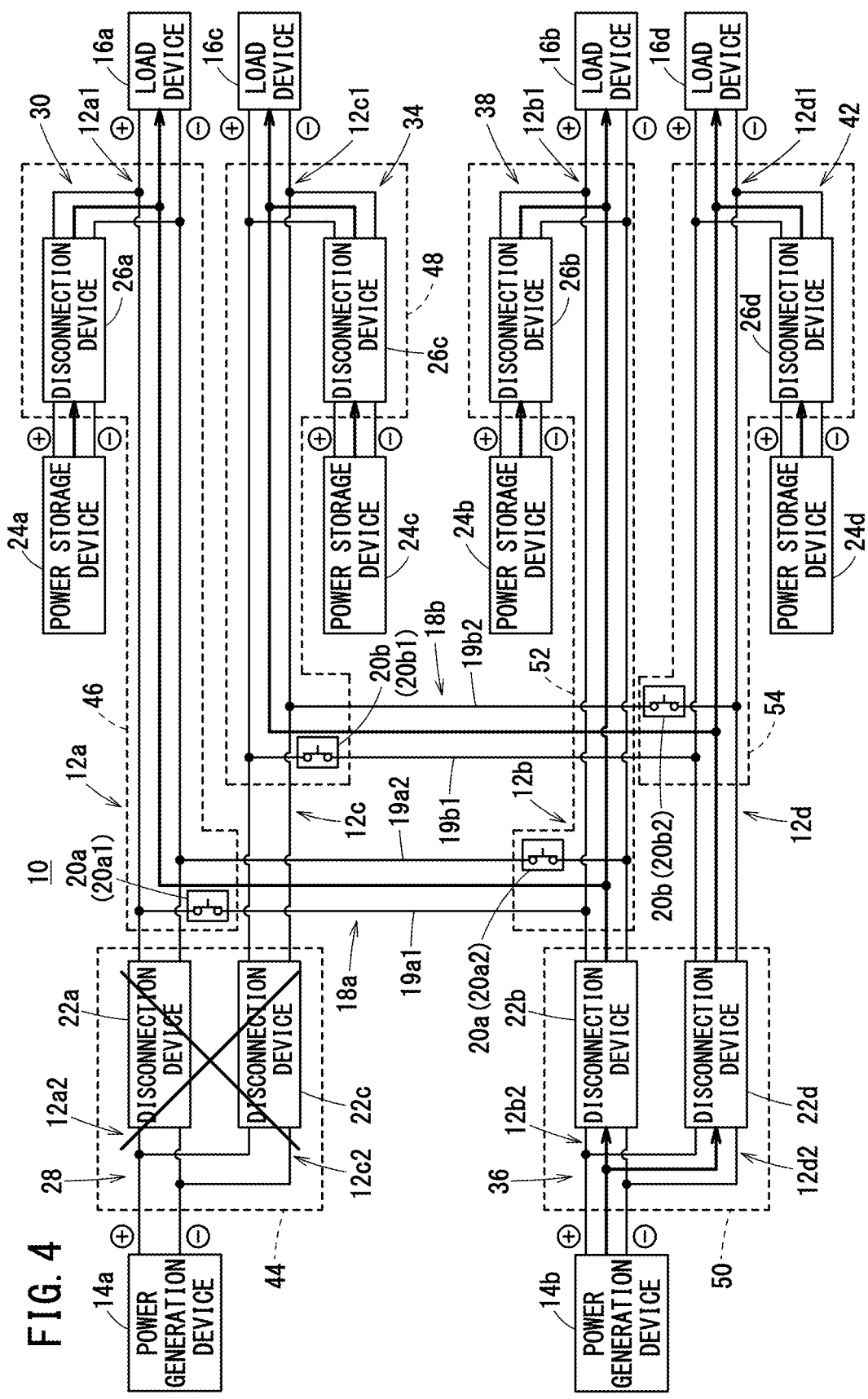
FIG. 4 is a diagram showing the operation of the power supply system when a first abnormality occurs.

FIG. 4 is a diagram showing the operation of the power supply system 10 when a first abnormality occurs. The arrows indicated by the thick lines in FIG. 4 indicate electric power supply paths. FIG. 4 shows the operation of the power supply system 10 in a case where the supply of electric power from the first power generation device 14a to the first power supply circuit 12a and the third power supply circuit 12c is cut off.

When an abnormality occurs in the area 44 in which the relay device 28 is disposed, the relay device 28 may fail. When the relay device 28 fails, the supply of electric power from the first power generation device 14a to the first load device 16a and the third load device 16c is cut off. In this case, the first power storage device 24a supplies electric power to the first load device 16a, and the third power storage device 24c supplies electric power to the third load device 16c. However, the first load device 16a and the third load device 16c may not be operated for a long time only by the first power storage device 24a and the third power storage device 24c.

In the present embodiment, the area 44 is partitioned by the partition 60 shown in FIG. 2. Therefore, the abnormality that has occurred in the area 44 does not affect the components outside the area 44. Accordingly, the components outside the area 44 can operate normally. Therefore, the electric power supply paths by the remaining power sources can be secured in the power supply system 10. Consequently, the operation of the power supply system 10 can be continued. According to the present embodiment, it is possible to provide the power supply system 10 with more redundancy.

When an abnormality shown in FIG. 4 occurs, the partial circuit 12*a*1 of the first power supply circuit 12*a* and the partial circuit 12*b*1 of the second power supply circuit 12*b* are connected by the first connection device 20*a*1 and the second connection device 20*a*2. As a result, electric power is supplied from the second power generation device 14*b* to the first load device 16*a*. Further, the partial circuit 12*c*1 of the third power supply circuit 12*c* and the partial circuit 12*d*1 of the fourth power supply circuit 12*d* are connected by the third connection device 20*b*1 and the fourth connection device 20*b*2. As a result, electric power is supplied from the second power generation device 14*b* to the third load device 16*c*. Therefore, the first load device 16*a* and the third load device 16*c* can be operated.

[Operation of Power Supply System when Second Abnormality Occurs]

Figure 5:
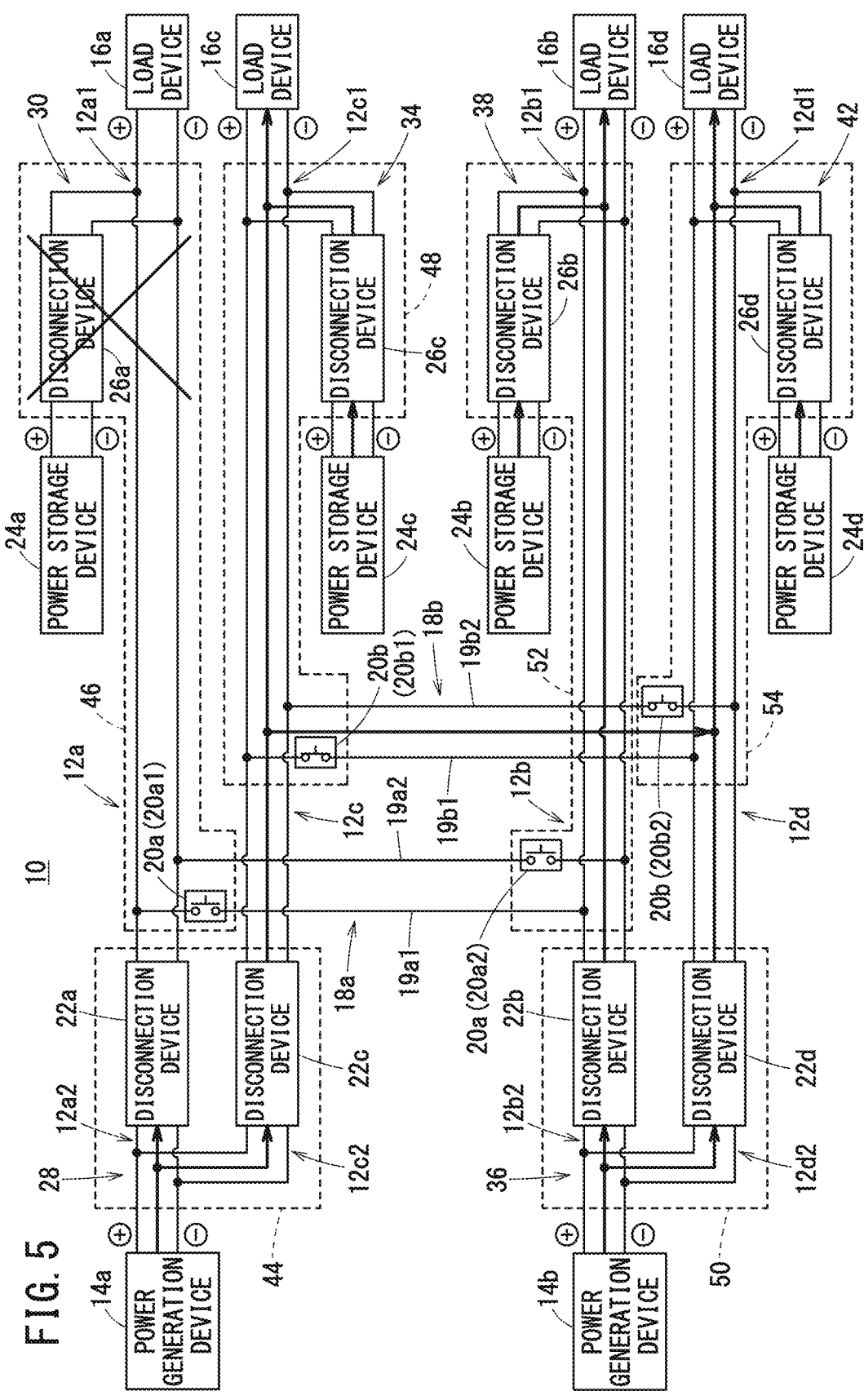
FIG. 5 is a diagram showing the operation of the power supply system when a second abnormality occurs.

FIG. 5 is a diagram showing the operation of the power supply system 10 when a second abnormality occurs. The arrows indicated by the thick lines in FIG. 5 indicate electric power supply paths. FIG. 5 shows the operation of the power supply system 10 in a case where the supply of electric power from the first power generation device 14*a* and the first power storage device 24*a* to the first load device 16*a* is cut off.

When an abnormality occurs in the area 46 in which the relay device 30 is disposed, the relay device 30 may fail. When the relay device 30 fails, the supply of electric power from the first power generation device 14*a* and the first power storage device 24*a* to the first load device 16*a* is cut off. In this case, the electric power generated by the first power generation device 14*a* is used only by the third load device 16*c*. Then, the electric power to be used by the first load device 16*a* is left, out of the electric power generated by the first power generation device 14*a*.

In the present embodiment, the area 46 is partitioned by the partition 60 shown in FIG. 2. Therefore, the abnormality that has occurred in the area 46 does not affect the components outside the area 46. Accordingly, the components outside the area 46 can operate normally.

In the case of the abnormality shown in FIG. 5, the partial circuit 12*c*1 of the third power supply circuit 12*c* and the partial circuit 12*d*1 of the fourth power supply circuit 12*d* are connected by the third connection device 20*b*1 and the fourth connection device 20*b*2. As a result, electric power is supplied from the first power generation device 14*a* to the fourth load device 16*d*. Therefore, the electric power generated by the first power generation device 14*a* is used not only by the third load device 16*c* but also by the fourth load device 16*d*. Accordingly, the surplus of the electric power generated by the first power generation device 14*a* can be effectively utilized.

Advantageous Effects Obtained by Arrangement of Connection Devices

The effects obtained by the arrangement of the respective connection devices (the first connection device 20*a*1, the second connection device 20*a*2, the third connection device 20*b*1, and the fourth connection device 20*b*2) will be described using a comparative example.

Figure 6:
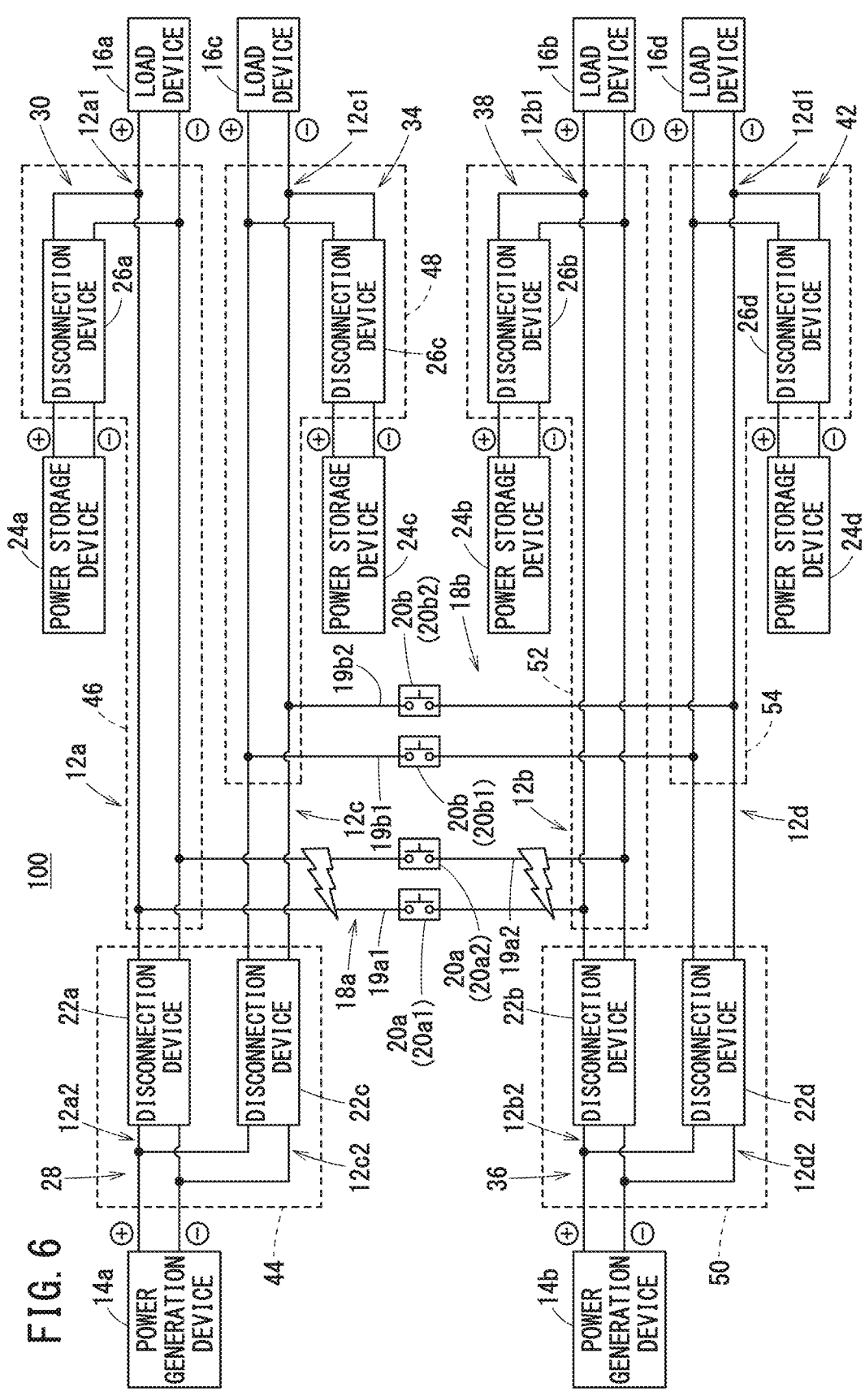
FIG. 6 is a schematic view of a power supply system according to a comparative example.

FIG. 6 is a schematic diagram of a power supply system 100 according to a comparative example. The power supply system 100 shown in FIG. 6 is different from the power supply system 10 (FIG. 1 and the like) according to the present embodiment in the arrangement of the respective connection devices (the first connection device 20*a*1, the second connection device 20*a*2, the third connection device 20*b*1, and the fourth connection device 20*b*2). In the power supply system 100, the first connection device 20*a*1 and the second connection device 20*a*2 are adjacent to each other in the same area. Similarly, in the power supply system 100, the third connection device 20*b*1 and the fourth connection device 20*b*2 are adjacent to each other in the same area.

The positive wire 19*a*1 and the negative wire 19*a*2 of the first connection circuit 18*a* are bundled. Normally, each of the positive wire 19*a*1 and the negative wire 19*a*2 is covered with an insulator. However, when the insulator is peeled off, the conductive portion is exposed. In a case where the conductive portion of the positive wire 19*a*1 and the conductive portion of the negative wire 19*a*2 come into contact with each other, a short circuit occurs regardless of whether the first connection device 20*a*1 and the second connection device 20*a*2 are in the connected state. Then, electric power ceases to be supplied to the load device provided in the power supply circuit in which the short circuit has occurred. Similarly, in the second connection circuit 18*b*, a short circuit occurs in a case where the conductive portion of the positive wire 19*b*1 and the conductive portion of the negative wire 19*b*2 come into contact with each other.

Figure 7:
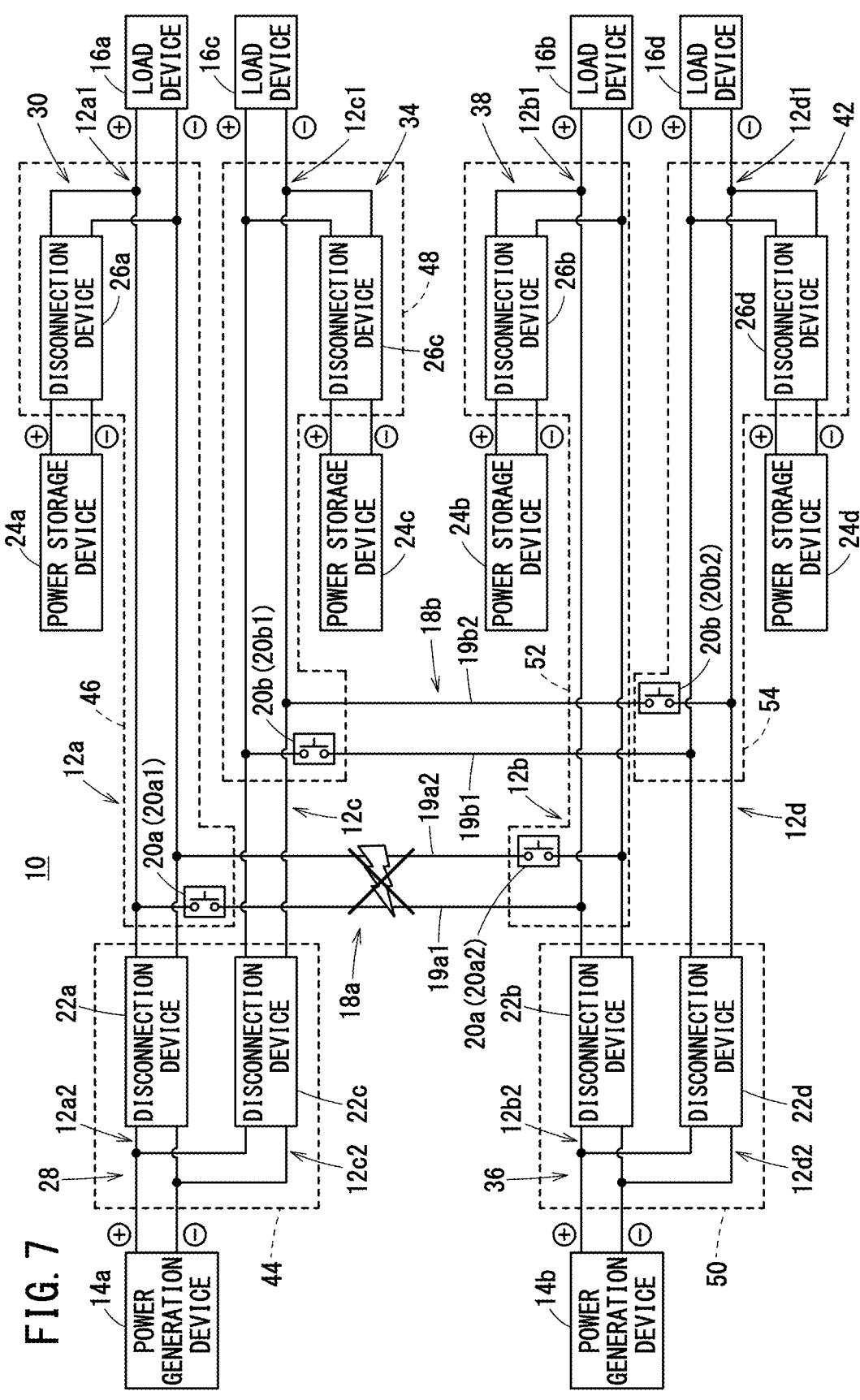
FIG. 7 is a diagram for explaining the effects of the arrangement of connection devices according to the present embodiment.

FIG. 7 is a diagram for explaining the effects of the arrangement of the connection devices according to the present embodiment. The first connection device 20*a*1 is disposed in the area 46 together with the relay device 30 of the first power supply circuit 12*a*. The second connection device 20*a*2 is disposed in the area 52 together with the relay device 38 of the second power supply circuit 12*b*. In a case where the first connection device 20*a*1 is in the disconnected state, a portion of the positive wire 19*a*1 of the first connection circuit 18*a*, which is disposed between the area 46 and the area 52, is connected to the positive side of the second power supply circuit 12*b*, but is not connected to the positive side of the first power supply circuit 12*a*. In a case where the second connection device 20*a*2 is in the disconnected state, a portion of the negative wire 19*a*2 of the first connection circuit 18*a*, which is disposed between the area 46 and the area 52, is connected to the negative side of the first power supply circuit 12*a*, but is not connected to the negative side of the second power supply circuit 12*b*. That is, in a state where the first connection device 20*a*1 and the second connection device 20*a*2 disconnect the first power supply circuit 12*a* and the second power supply circuit 12*b* from each other, the positive wire 19*a*1 and the negative wire 19*a*2 are connected to different circuits. Therefore, as long as the first connection device 20*a*1 and the second connection device 20*a*2 are in the disconnected state, no short circuit occurs between the area 46 and the area 52 even if the conductive portion of the positive wire 19*a*1 and the conductive portion of the negative wire 19*a*2 come into contact with each other.

As described above, according to the present embodiment, the first connection device 20*a*1 is disposed on the first end portion side of the first connection circuit 18*a* (in the area 46), and the second connection device 20*a*2 is disposed on the second end portion side of the first connection circuit 18*a* (in the area 52). Therefore, it is possible to reduce the risk of short-circuiting in the first connection circuit 18*a*. As a result, it is possible to suppress a situation in which electric power is not supplied to the load device due to a short circuit in the first connection circuit 18*a*. Therefore, the power supply system 10 with more redundancy can be provided.

Similarly, according to the present embodiment, the third connection device 20*b*1 is disposed on the first end portion side of the second connection circuit 18*b* (in the area 48), and the fourth connection device 20*b*2 is disposed on the second end portion side of the second connection circuit 18*b* (in the area 54). Therefore, it is possible to reduce the risk of short-circuiting in the second connection circuit 18*b*. As a result, it is possible to suppress a situation in which electric power is not supplied to the load device due to a short circuit in the second connection circuit 18*b*. Therefore, the power supply system 10 with more redundancy can be provided.

Modification

Figure 8:
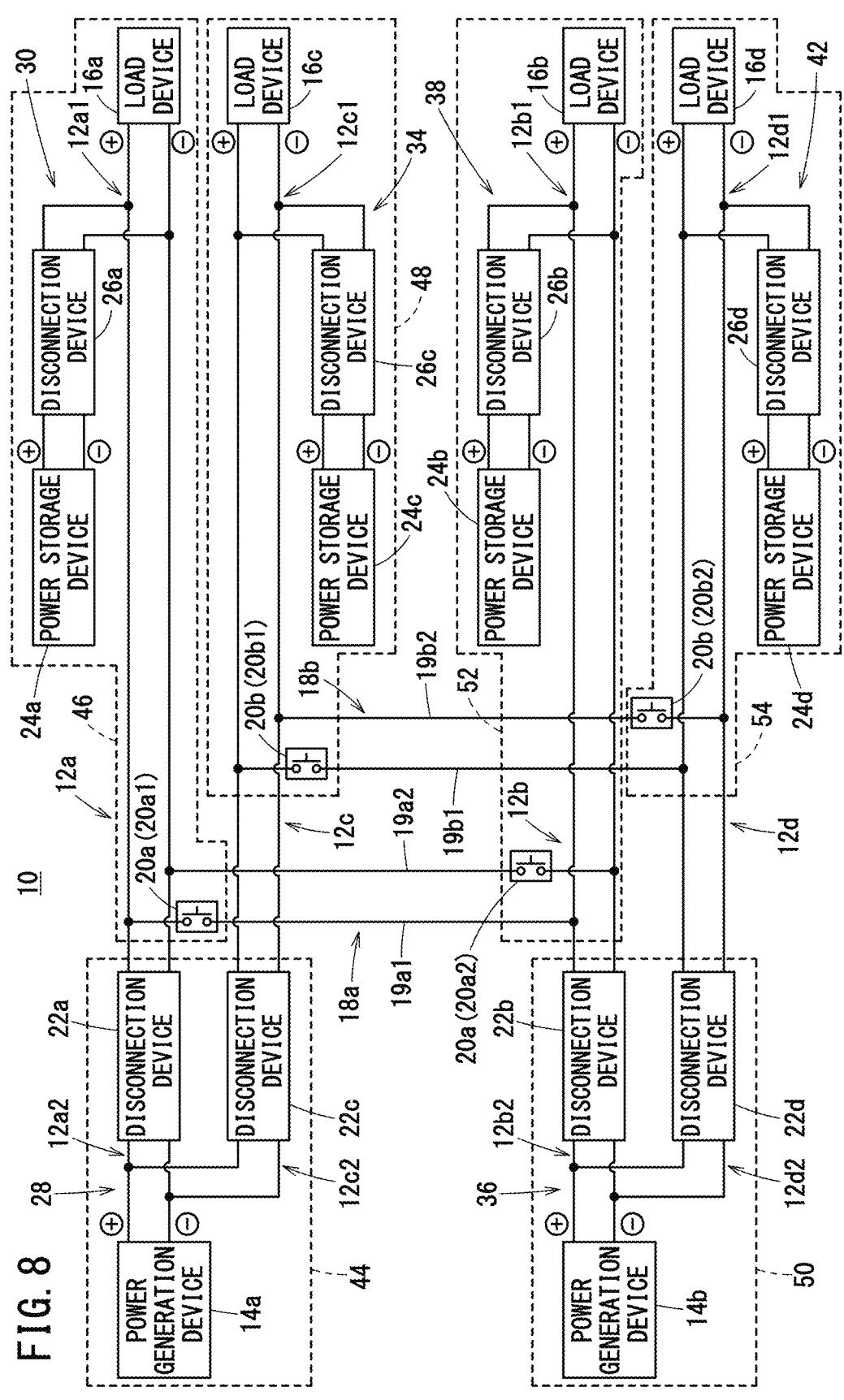
FIG. 8 is a schematic view of the power supply system according to a first modification.

FIG. 8 is a schematic view of the power supply system 10 according to a first modification. As shown in FIG. 8, the first power generation device 14*a* may be disposed in the area 44. The second power generation device 14*b* may be disposed in the area 50. At least one of the first power storage device 24*a* or the first load device 16*a* may be disposed in the area 46. At least one of the second power storage device 24*b* or the second load device 16*b* may be disposed in the area 52. At least one of the third power storage device 24*c* or the third load device 16*c* may be disposed in the area 48. At least one of the fourth power storage device 24*d* or the fourth load device 16*d* may be disposed in the area 54.

In this manner, at least one of the first power generation device 14*a*, the second power generation device 14*b*, the first load device 16*a*, the second load device 16*b*, the third load device 16*c*, the fourth load device 16*d*, the first power storage device 24*a*, the second power storage device 24*b*, the third power storage device 24*c*, or the fourth power storage device 24*d* may be disposed in the area together with the relay device.

Figure 9:
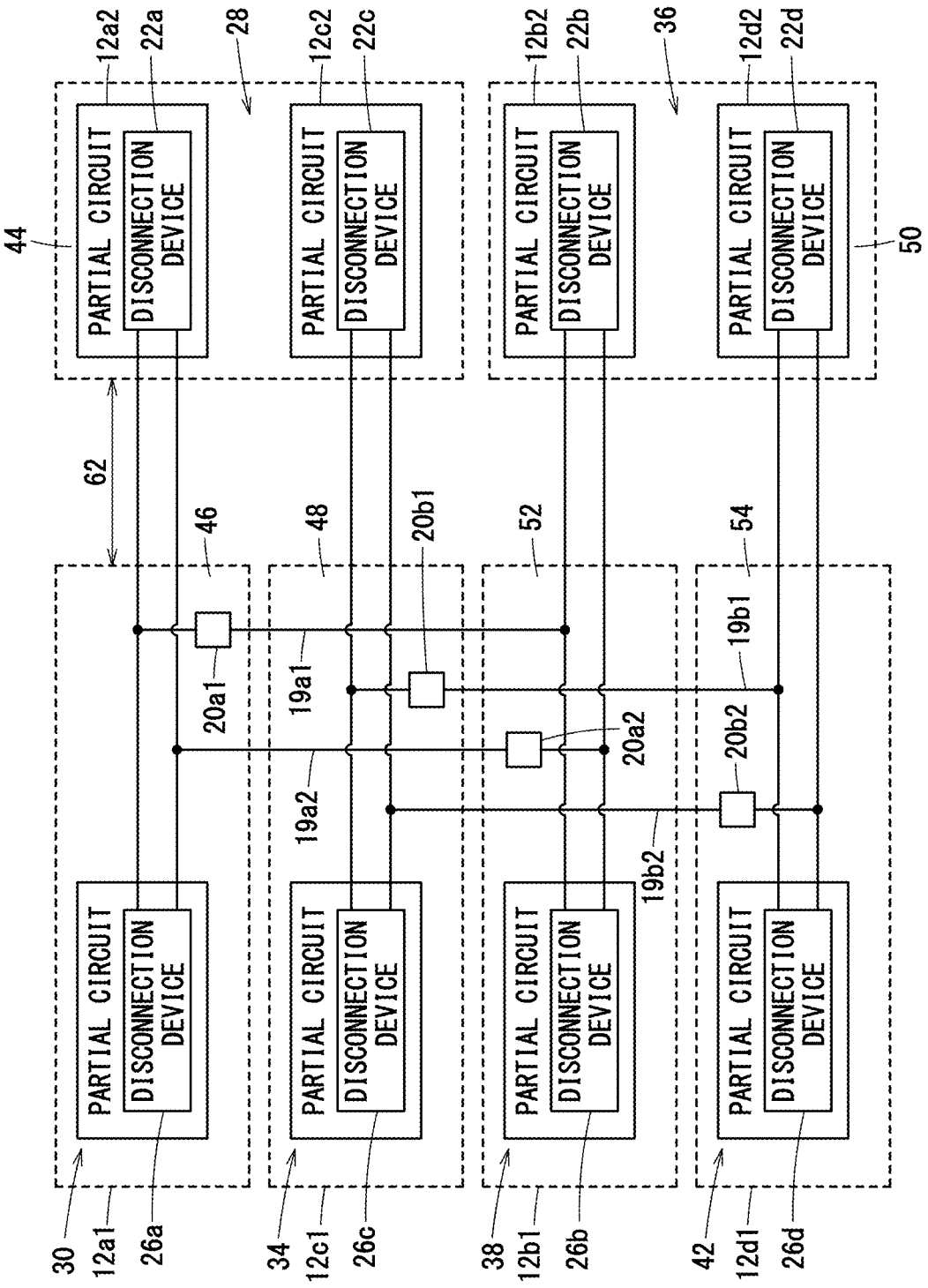
FIG. 9 is a schematic view of the power supply system according to a second modification.

FIG. 9 is a schematic view of the power supply system 10 according to a second modification. As shown in FIG. 9, the areas 44, 46, 48, 50, 52, and 54 may be spaced apart from each other by a predetermined distance or more. In this case, a gap 62 having the predetermined distance or more is provided between two areas adjacent to each other. The predetermined distance is set in advance so that an abnormality that has occurred in one of two adjacent areas does not affect the other.

In the present embodiment, two load devices and two power storage devices are connected to one power generation device. However, the present invention is not limited thereto. For example, one load device and one power storage device may be connected to one power generation device. Further, three or more load devices and three or more power storage devices may be connected to one power generation device. In addition, the power supply system 10 may include three or more combinations of one power generation device, one or more load devices, and one or more power storage devices.

Second Embodiment

Figure 10:
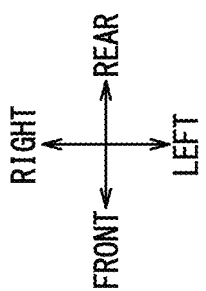
FIG. 10 is a schematic view of a moving object.
Figure 10:
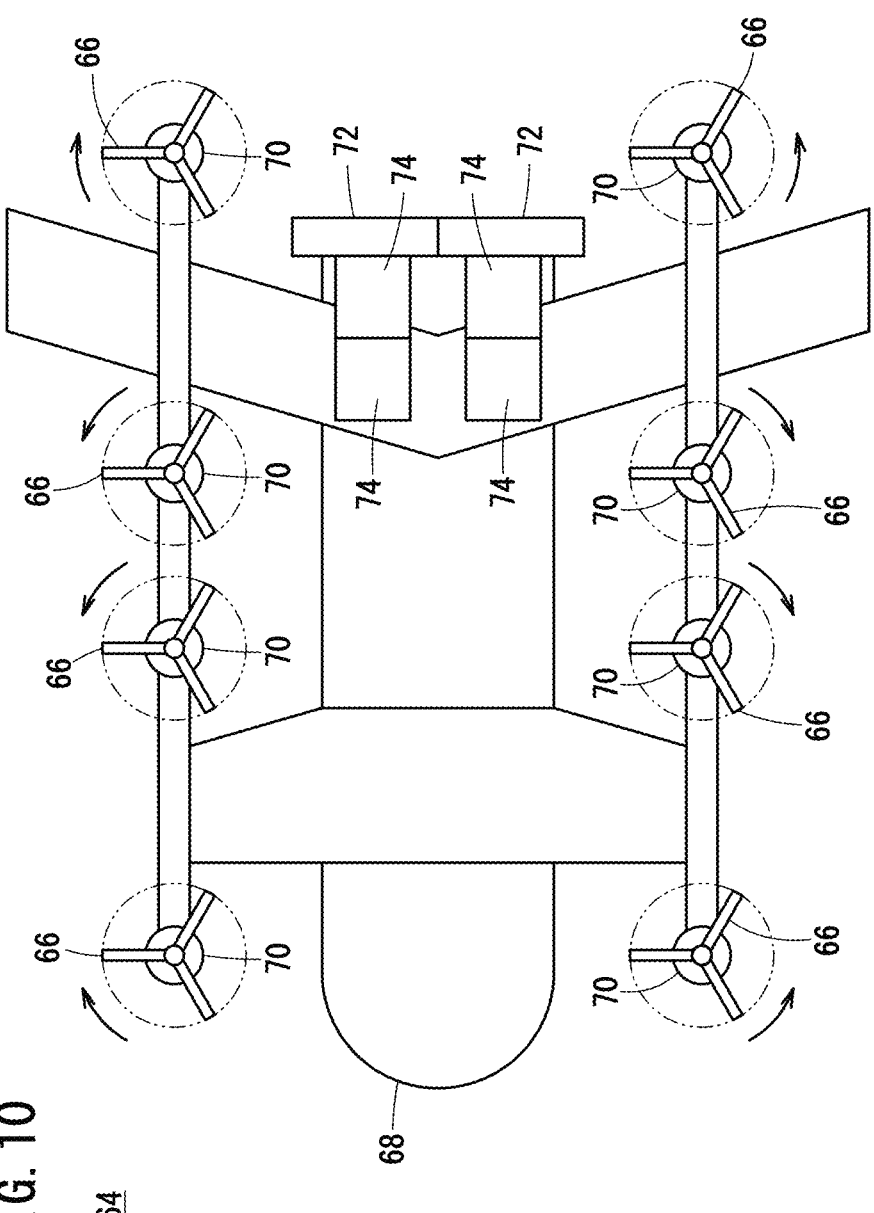

FIG. 10 is a schematic view of a moving object 64. The power supply system 10 is mounted on the moving object 64.

The moving object 64 of the present embodiment is an electric vertical take-off and landing aircraft (eVTOL aircraft). The moving object 64 includes eight VTOL rotors 66. The VTOL rotors 66 generate upward thrust for a fuselage 68. The moving object 64 includes eight electric motors 70. One electric motor 70 drives one VTOL rotor 66. The moving object 64 includes two cruise rotors 72. The cruise rotors 72 generate forward thrust for the fuselage 68. The moving object 64 includes four electric motors 74. Two electric motors 74 drive one cruise rotor 72.

Each of the first load device 16*a*, the second load device 16*b*, the third load device 16*c*, and the fourth load device 16*d* may include two electric motors 70 and one electric motor 74. Each of the first load device 16*a*, the second load device 16*b*, the third load device 16*c*, and the fourth load device 16*d* may include a low-voltage drive device in addition to the electric motors 70 and the electric motor 74.

The moving object 64 is not limited to an aircraft, and may be a ship, an automobile, a train, or the like.

According to the second embodiment, it is possible to provide the moving object 64 with redundancy.

SUPPLEMENTARY NOTE

The following supplementary notes are further disclosed in relation to the above-described embodiments.

Supplementary Note 1

The power supply system (10) of the present disclosure includes: the first power supply circuit (12*a*) configured to supply, to the first load device (16*a*), DC power output from the first power generation device (14*a*); the second power supply circuit (12*b*) configured to supply, to the second load device (16*b*), DC power output from the second power generation device (14*b*); and the first connection circuit (18*a*) including the first connection device (20*a*1) configured to connect the positive side of the first power supply circuit and the positive side of the second power supply circuit, and the second connection device (20*a*2) configured to connect the negative side of the first power supply circuit and the negative side of the second power supply circuit, wherein the first connection device is disposed on one end side of the first connection circuit and the second connection device is disposed on the other end side of the first connection circuit.

According to the above configuration, the first connection device is disposed on one end side of the first connection circuit, and the second connection device is disposed on the other end side of the first connection circuit. Therefore, it is possible to reduce the risk of short-circuiting in the first connection circuit. As a result, it is possible to suppress a situation in which electric power is not supplied to the load device due to a short circuit in the first connection circuit. Therefore, a power supply system with more redundancy can be provided.

Supplementary Note 2

The power supply system according to Supplementary Note 1 may further include the third power supply circuit (12*c*) configured to supply, to the third load device (16*c*), the DC power output from the first power generation device, wherein an area in which the third power supply circuit is disposed may be located between an area in which the first power supply circuit is disposed and an area in which the second power supply circuit is disposed, the first connection device may be disposed between the area in which the first power supply circuit is disposed and the area in which the third power supply circuit is disposed, and the second connection device may be disposed between the area in which the second power supply circuit is disposed and the area in which the third power supply circuit is disposed.

Supplementary Note 3

In the power supply system according to Supplementary Note 1, the first power supply circuit and the first connection device may be disposed in the first area (46), and the second power supply circuit and the second connection device may be disposed in the second area (52) separated from the first area.

According to the above configuration, an abnormality that has occurred in the first area does not affect components outside the first area. Similarly, an abnormality that has occurred in the second area does not affect components outside the second area. Therefore, the components outside the area in which the abnormality has occurred can operate normally. As a result, electric power supply paths by the remaining power sources can be secured in the power supply system. That is, according to the above configuration, it is possible to provide a power supply system with more redundancy.

Supplementary Note 4

In the power supply system according to Supplementary Note 1, the first power supply circuit and the first connection device may be disposed in the first area, the second power supply circuit and the second connection device may be disposed in the second area, and the first area and the second area may be partitioned from each other by the partition (60).

According to the above configuration, the first area and the second area can be reliably separated from each other.

Supplementary Note 5

The power supply system according to Supplementary Note 1 may further include: the third power supply circuit (12c) configured to supply, to the third load device (16c), the DC power output from the first power generation device; the fourth power supply circuit (12d) configured to supply, to the fourth load device (16d), the DC power output from the second power generation device; and the second connection circuit (18b) including the third connection device (20b1) configured to connect the positive side of the third power supply circuit and the positive side of the fourth power supply circuit, and the fourth connection device (20b2) configured to connect the negative side of the third power supply circuit and the negative side of the fourth power supply circuit, wherein the third connection device may be disposed on one end side of the second connection circuit, the fourth connection device may be disposed on the other end side of the second connection circuit, the third power supply circuit may be disposed between the first power supply circuit and the second power supply circuit, and the second power supply circuit may be disposed between the third power supply circuit and the fourth power supply circuit.

Supplementary Note 6

The power supply system according to Supplementary Note 1 may further include: the first power storage device (24a) connected to the first power supply circuit in parallel with the first power generation device; the second power storage device (24b) connected to the second power supply circuit in parallel with the second power generation device; the first relay device (30) including the first partial circuit (12a1) that is a part of the first power supply circuit, and including the first disconnection device (26a) configured to disconnect the first power storage device from the first partial circuit; the second relay device (28) including the second partial circuit (12a2) that is another part of the first power supply circuit, and including the second disconnection device (22a) configured to disconnect the first power generation device from the first partial circuit; the third relay device (38) including the third partial circuit (12b1) that is a part of the second power supply circuit, and including the third disconnection device (26b) configured to disconnect the second power storage device from the third partial circuit; and the fourth relay device (36) including the fourth partial circuit (12b2) that is another part of the second power supply circuit, and including the fourth disconnection device (22b) configured to disconnect the second power generation device from the third partial circuit, wherein the first connection device may be configured to connect the positive wire of the first partial circuit and the positive wire of the third partial circuit, and the second connection device may be configured to connect the negative wire of the first partial circuit and the negative wire of the third partial circuit.

Supplementary Note 7

The moving object (64) of the present disclosure includes the power supply system according to any one of Supplementary Notes 1 to 6.

According to the above configuration, it is possible to provide a moving object with redundancy.

Although the present disclosure has been described in detail, the present disclosure is not limited to the above-described individual embodiments. Various additions, replacements, modifications, partial deletions, and the like can be made to these embodiments without departing from the gist of the present disclosure or without departing from the gist of the present disclosure derived from the claims and equivalents thereof. Further, these embodiments can also be implemented in combination. For example, in the above-described embodiments, the order of operations and the order of processes are shown as examples, and are not limited to these. Furthermore, the same applies to a case where numerical values or mathematical expressions are used in the description of the above-described embodiments.

The invention claimed is:

1. A power supply system comprising:
a first power supply circuit configured to supply, to a first load device, direct current electric power output from a first power generation device;
a second power supply circuit configured to supply, to a second load device, direct current electric power output from a second power generation device; and
a first connection circuit including a first connection device configured to connect a positive side of the first power supply circuit and a positive side of the second power supply circuit, and a second connection device configured to connect a negative side of the first power supply circuit and a negative side of the second power supply circuit,
wherein
the first connection circuit includes:
a positive wire connected to a positive side of the first power supply circuit and a positive side of the second power supply circuit, and
a negative wire connected to a negative side of the first power supply circuit and a negative side of the second power supply circuit,
the first connection device is disposed on the positive wire of the first connection circuit,
the second connection device is disposed on the negative wire of the first connection circuit,

a distance between the first connection device and a portion at which the positive wire of the first connection circuit is connected to the positive side of the first power supply circuit is a first distance, a distance between the first connection device and a portion at which the positive wire of the first connection circuit is connected to the positive side of the second power supply circuit is a second distance, the first distance being less than the second distance, and a distance between the second connection device and a portion at which the negative wire of the first connection circuit is connected to the negative side of the first power supply circuit is a third distance, a distance between the second connection device and a portion at which the negative wire of the first connection circuit is connected to the negative side of the second power supply circuit is a fourth distance, the third distance being greater than the fourth distance.

2. The power supply system according to claim 1, further comprising a third power supply circuit configured to supply, to a third load device, the direct current electric power output from the first power generation device, wherein an area in which the third power supply circuit is disposed is located between an area in which the first power supply circuit is disposed and an area in which the second power supply circuit is disposed, and the first connection device is disposed between the area in which the first power supply circuit is disposed and the area in which the third power supply circuit is disposed, and the second connection device is disposed between the area in which the second power supply circuit is disposed and the area in which the third power supply circuit is disposed.

3. The power supply system according to claim 1, wherein the first power supply circuit and the first connection device are disposed in a first area, and the second power supply circuit and the second connection device are disposed in a second area separated from the first area.

4. The power supply system according to claim 1, wherein the first power supply circuit and the first connection device are disposed in a first area, the second power supply circuit and the second connection device are disposed in a second area, and the first area and the second area are partitioned from each other by a partition.

5. The power supply system according to claim 1, further comprising:

a third power supply circuit configured to supply, to a third load device, the direct current electric power output from the first power generation device;

a fourth power supply circuit configured to supply, to a fourth load device, the direct current electric power output from the second power generation device; and a second connection circuit including a third connection device configured to connect a positive side of the third power supply circuit and a positive side of the fourth power supply circuit, and a fourth connection device configured to connect a negative side of the third power supply circuit and a negative side of the fourth power supply circuit, wherein the second connection circuit includes:

a positive wire connected to a positive side of the third power supply circuit and positive side of the fourth power supply circuit, and

a negative wire connected to a negative side of the third power supply circuit and a negative side of the fourth power supply circuit, the third connection device is disposed on the positive wire of the second connection circuit, the fourth connection device is disposed the negative wire of the second connection circuit, a distance between the third connection device and a portion at which the positive wire of the second connection circuit is connected to the positive side of the third power supply circuit is a fifth distance, a distance between the third connection device and a portion at which the positive wire of the second connection circuit is connected to the positive side of the fourth power supply circuit is a sixth distance, the fifth distance being less than the sixth distance, and a distance between the fourth connection device and a portion at which the negative wire of the second connection circuit is connected to the negative side of the third power supply circuit is a seventh distance, a distance between the fourth connection device and a portion at which the negative wire of the second connection circuit is connected to the negative side of the fourth power supply circuit is an eighth distance, the seventh distance being greater than the eighth distance, the third power supply circuit is disposed between the first power supply circuit and the second power supply circuit, and the second power supply circuit is disposed between the third power supply circuit and the fourth power supply circuit.

6. The power supply system according to claim 1, further comprising:

a first power storage device connected to the first power supply circuit in parallel with the first power generation device;

a second power storage device connected to the second power supply circuit in parallel with the second power generation device;

a first relay device including a first partial circuit that is a part of the first power supply circuit, and including a first disconnection device configured to disconnect the first power storage device from the first partial circuit;

a second relay device including a second partial circuit that is another part of the first power supply circuit, and including a second disconnection device configured to disconnect the first power generation device from the first partial circuit;

a third relay device including a third partial circuit that is a part of the second power supply circuit, and including a third disconnection device configured to disconnect the second power storage device from the third partial circuit; and a fourth relay device including a fourth partial circuit that is another part of the second power supply circuit, and including a fourth disconnection device configured to disconnect the second power generation device from the third partial circuit, wherein the first connection device is configured to connect a positive wire of the first partial circuit and a positive wire of the third partial circuit, and the second connection device is configured to connect a negative wire of the first partial circuit and a negative wire of the third partial circuit.

7. A moving object comprising the power supply system according to claim 1.

8. The power supply system according to claim 5, wherein the first connection device, the second connection device, the third connection device, and the fourth connection device are partitioned by a partition.

9. The power supply system according to claim 8, wherein the partition is made of a flame-retardant material.

\* \* \* \* \*